(12) United States Patent
Parfitt

(10) Patent No.: US 9,248,700 B1
(45) Date of Patent: Feb. 2, 2016

(54) BICYCLE HUB ASSEMBLY WITH CASSETTE HOUSING

(71) Applicant: Jeremy Parfitt, Broomfield, CO (US)

(72) Inventor: Jeremy Parfitt, Broomfield, CO (US)

( * ) Notice: Subject to any disclaimer, the term of this patent is extended or adjusted under 35 U.S.C. 154(b) by 471 days.

(21) Appl. No.: 13/854,787

(22) Filed: Apr. 1, 2013

(51) Int. Cl.
*B60C 29/06* (2006.01)
*B60B 27/04* (2006.01)
*B60B 27/02* (2006.01)

(52) U.S. Cl.
CPC .......... *B60B 27/047* (2013.01); *B60B 27/023* (2013.01)

(58) Field of Classification Search
CPC .... B60B 27/047; B60B 27/023; B60B 27/06; B60B 35/00; F16D 41/24; F16D 41/26; F16D 41/28; F16D 41/30
USPC ............................. 301/110.5, 124.1; 192/64
See application file for complete search history.

(56) References Cited

U.S. PATENT DOCUMENTS

| | | | | |
|---|---|---|---|---|
| 3,870,383 A * | 3/1975 | Morisaki | ........... | F16C 33/103 184/6.17 |
| 8,141,438 B2 * | 3/2012 | Roessingh | ........... | B62M 9/12 73/862.191 |
| 8,449,157 B2 * | 5/2013 | Guzik | ........... | B62J 6/00 280/279 |
| 8,607,647 B1 * | 12/2013 | Wilson | ........... | G01L 3/104 73/862.08 |
| 8,757,341 B2 * | 6/2014 | Klieber | ........... | B60B 27/047 192/110 B |
| 2008/0006500 A1 * | 1/2008 | Spahr | ........... | B60B 27/0073 192/64 |
| 2009/0008987 A1 * | 1/2009 | Hoogendoorn | ...... | B60B 27/0052 301/110.5 |

* cited by examiner

*Primary Examiner* — S. Joseph Morano
*Assistant Examiner* — Jean Charleston
(74) *Attorney, Agent, or Firm* — Edwin H. Crabtree; Ramon L. Pizarro

(57) ABSTRACT

A hub assembly adapted for mounting on a bicycle wheel. The hub assembly includes a hub shell with a first flange and a driver side flange. The assembly is received around a hub axle. The hub axle is received through the hub shell and attached to a bicycle frame. One end of the hub axle is disposed next to the first flange. The end of the hub axle is supported on a first hub axle bearing. Also, the hub assembly includes a cassette body with a cassette body bearing. An opposite end of the hub axle is supported on a second hub axle bearing next to the cassette body bearing. A driver gear, received in a threaded cavity in one side of the driver side flange, is used for driving the hub assembly and the cassette body on the hub axle.

18 Claims, 4 Drawing Sheets

(Prioir Art)

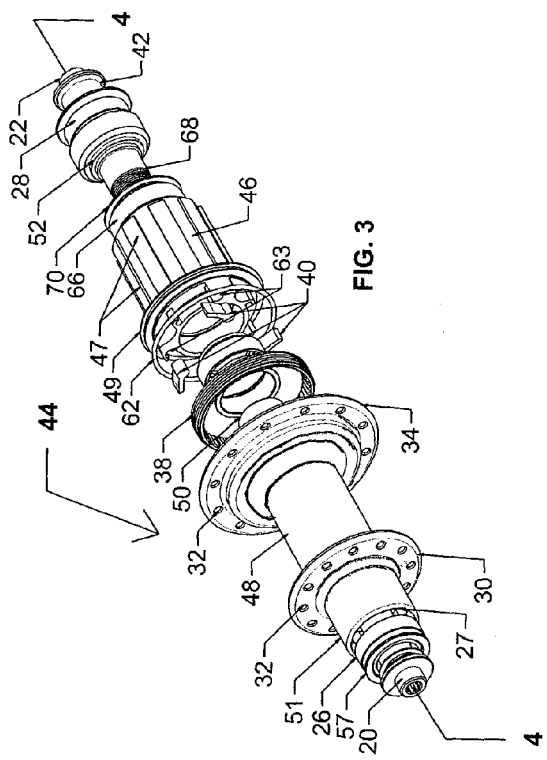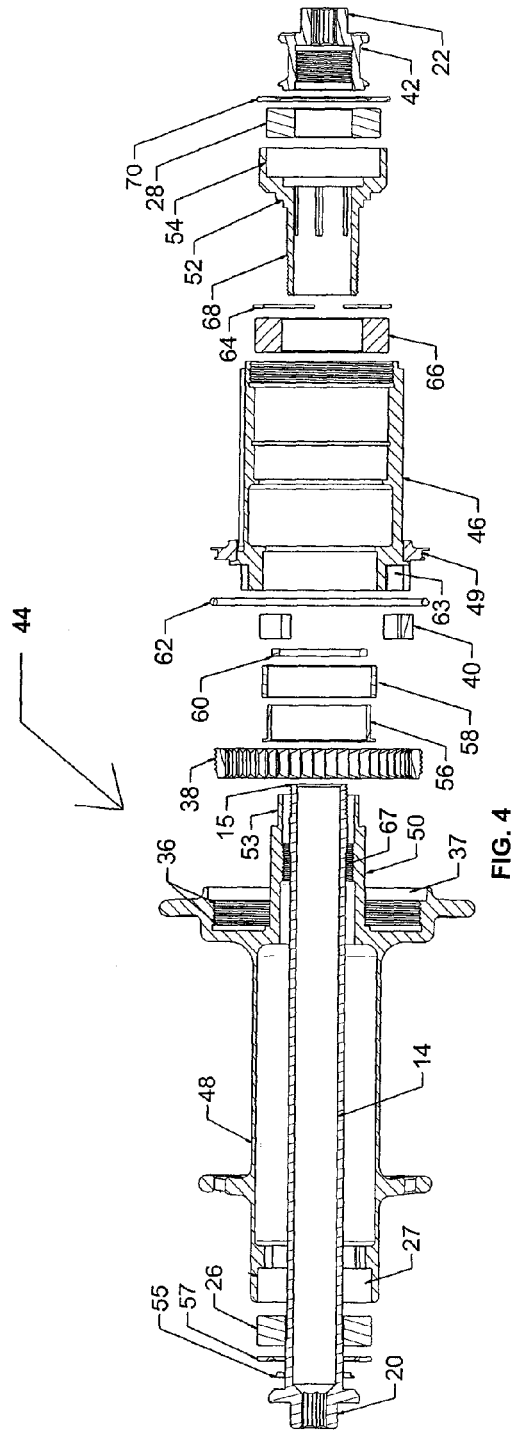

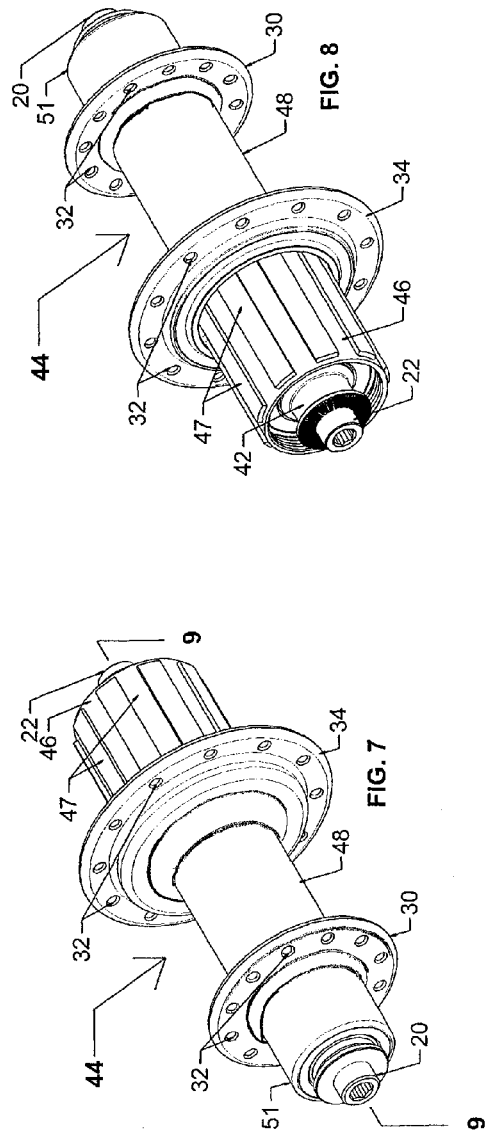
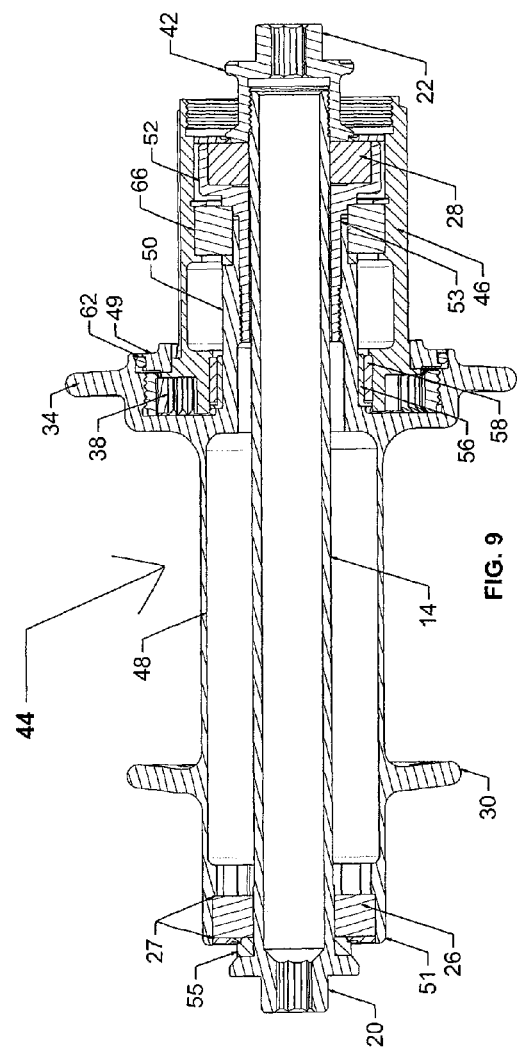

BICYCLE HUB ASSEMBLY WITH CASSETTE HOUSING

BACKGROUND OF THE INVENTION (a) Field of the Invention

This invention relates to a bicycle hub assembly for holding a plurality of chain gear sprockets, commonly called a "cassette", attached to a ratcheting cassette body, and more particularly, but not by way of limitation, to a hub assembly with a cassette body that is supported entirely by a hub shell itself. The hub assembly, used for supporting the cassette body, is designed to eliminate an unsupported span of a rear hub axle common on modern hubs. The benefits of this hub assembly design are: increased lateral rigidity of the rear hub axle, improved bearing durability, improved stiffness to weight ratio of the hub assembly, greater efficiency of torque transfer when applying pedal load to the hub assembly during the operation of a bicycle, and significant improvement to the lateral rigidity of the complete wheel.

(b) Discussion of the Prior Art

Modern day bicycle rear wheel hub assemblies include a cassette body mounted on an unsupported portion of an extended rear hub axle. The cassette body provides for "free wheeling" when coasting on the bicycle, and driving the bicycle when not coasting. The body makes for easy gear sprocket changes and customized gear ratios. But, because the rear hub axle is unsupported when extending outwardly from one side of the rear hub shell, load and alignment problems occur. For example, the extended hub axle span allows the hub axle to flex significantly under lateral and torsion loads. This flexing of the hub axle causes bearing misalignment, which in turn increases loaded drag and leads to premature bearing failure. Also, the flexing of the hub axle significantly reduces the lateral rigidity of the entire rear wheel.

Others have tried to reduce the above mentioned rear hub axle and bearing problems by the use of a stiffer hub axle, which in turn creates additional problems. A stiffer hub axle can be made of steel, rather than lightweight aluminum, with a thick wall to create a significant increase in stiffness. But this approach adds unnecessary weight to the hub assembly.

Another solution by others has been to use a large diameter aluminum hub axle, which can be made reasonably light and stiff. However, this feature requires the use of thin section bearings, which tend to wear out quickly or become damaged, which adds significant drag to the hub assembly.

Still another approach by others has been to use a separate bolt-on cassette body attached to one end of the rear hub assembly. In this example, the cassette body is excessively heavy with a ratchet driver housed inside the body. Because of the diameter constraints of the cassette cogs, the internal diameter of the cassette body is relatively small. Therefore, the ratchet driver inside the cassette body is reduced in size, severely limiting the strength and performance of the hub assembly.

The subject hub assembly, as described herein, provides clear-cut objects, advantages and unique structural features heretofore not incorporated into a rear wheel cassette style hub assembly to eliminate the above mentioned problems related to an unsupported rear hub axle span.

SUMMARY OF THE INVENTION

In view of the foregoing, it is a primary objective of the subject invention to provide a greatly improved hub assembly for supporting a cassette body and a rear hub axle on a bicycle rear wheel.

Another object of the invention is with the added support of the rear hub axle, hub axle flexing is reduced during gear loading, misalignment of bearing is reduced for improved bearing life, and lateral rigidity of the entire rear wheel is increased.

Still another object of the invention is a larger driver gear is mounted exterior to the cassette body for providing a finer engagement of pawls and a much higher load capacity.

The subject invention includes a bicycle rear wheel hub assembly adapted for mounting on a rear wheel and a portion of a bicycle frame. The hub assembly includes a hollow hub shell with a circular first flange disposed around an outer circumference of the hub shell and a spaced apart circular driver side flange disposed around the outer circumference of the hub shell. Also, the hub assembly includes rear hub axle received through the hub shell and having opposite ends adapted for attachment to the bicycle frame. A first end of the hub axle is disposed next to the first flange and a second end of the hub axle extends outwardly from the driver side flange. The first end of the hub axle is supported on a first hub axle bearing. Further, the hub assembly includes a cassette body with cassette body bearing, a threaded bearing cup with a second hub axle bearing and a hub axle end cap. The hub axle end cap is used for adjusting the bearing preload of the hub axle assembly. A driver gear with a set of pawls is mounted inside a driver gear cavity in the driver side flange.

BRIEF DISCUSSION OF THE DRAWINGS

The accompanying drawings illustrate complete preferred embodiments in the present invention and according to the best modes presently devised for a practical application of the subject bicycle hub assembly, and in which:

FIG. 3 is an exploded, perspective view of the subject hub assembly.

FIG. 4 is a cross sectional view of the hub assembly that shows the extended section on the right side of the hub shell, taken along lines 4-4 shown in FIG. 3.

FIGS. 7 and 8 are front and rear perspective views of the completely assembled hub assembly with the cassette body as shown in FIG. 3 and prior to attaching to a rear wheel of a bicycle.

FIG. 9 is a cross sectional view of the assembled hub assembly shown in FIG. 7 and taken along lines 9-9.

DETAILED DESCRIPTION OF THE PREFERRED EMBODIMENTS

Figure 1:
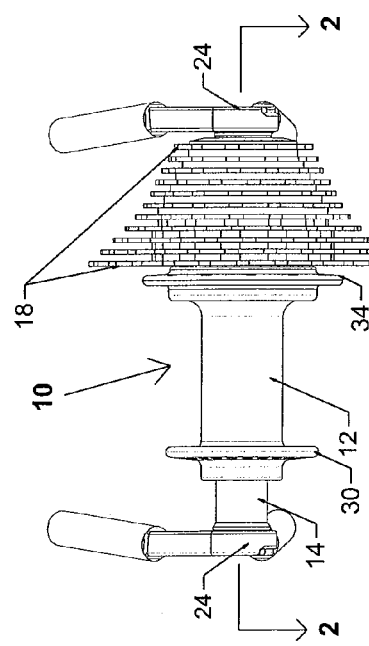
FIG. 1 is a front view of a prior art rear wheel hub assembly with a hub shell and a rear wheel hub axle with an extended unsupported span for receiving chain gear sprockets thereon.
Figure 2:
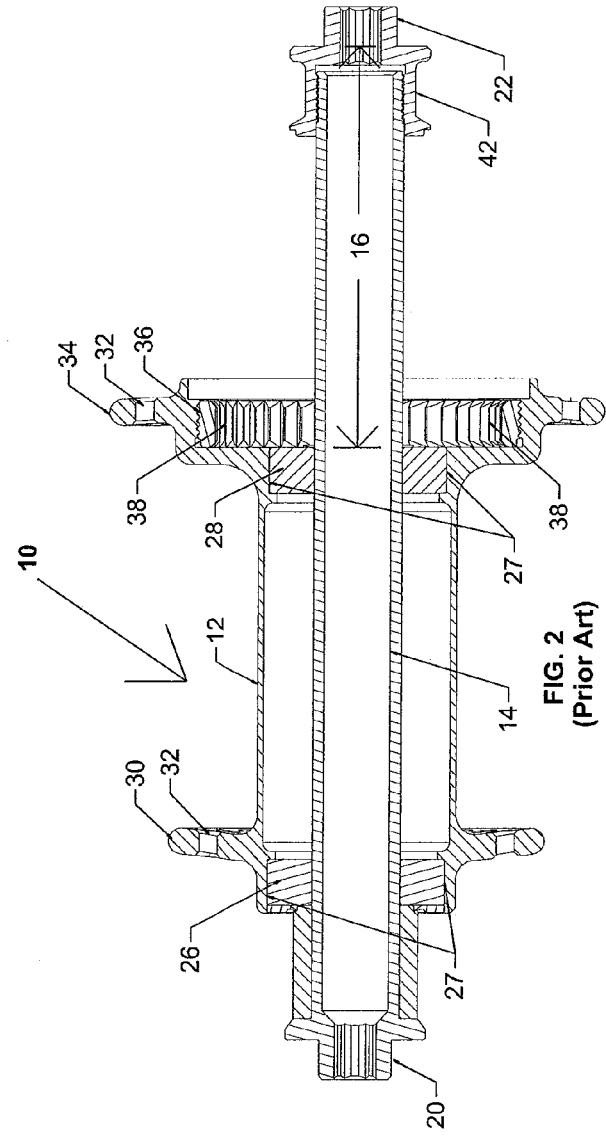
FIG. 2 is a cross sectional view of the hub assembly taken along lines 2-2 shown in FIG. 1.

In FIG. 1, a front view of a prior art rear wheel hub assembly is shown having a general reference numeral 10. The prior art hub assembly 10 includes a hollow hub shell 12 with a rear hub axle 14 extending there through and having an unsupported span 16 for receiving a plurality of chain gear sprockets 18. The sprockets 18 are shown in cross section. The hub axle 14 includes a first end 20 and a second end 22. The unsupported span 16 and first and second ends 20 and 22 are shown in FIG. 2. The first and second ends 20 and 22 are received in dropouts 24, which are part of a rear triangle of a bicycle frame. The dropouts 24, on modern bicycle frame, allow a rear wheel to be removed without first derailing a bike chain.

In FIG. 2, a cross sectional view of the hub assembly 10 is shown and taken along lines 2-2 in FIG. 1. In this drawing, the hub shell 12 is shown rotatably mounted on a first hub axle bearing 26 and a spaced apart second hub axle bearing 28. The bearings 26 and 28 are mounted in hub shell bearing bores 27 and support the hub axle 14. Disposed next to the first hub axle bearing 26 and part of the hub shell 12 is an outwardly extending, circular first flange 30. An outer circumference of the flange 30 includes a plurality of spaced apart spoke holes 32 for attaching to spokes on a bicycle wheel. The spokes and wheel are not shown in the drawings.

Disposed next to the second wheel hub axle bearing 28 and part of the hub assembly 10 is an outwardly extending, circular driver side flange 34. An outer circumference of the flange 34 also includes a plurality of spaced apart spoke holes 32 for attaching to the spokes of the bicycle wheel. In the center of one side of the driver side flange 34 is a threaded driver gear cavity 36. The driver gear cavity 36 is used for receiving a driver gear 38 with spaced apart pawls 40. The pawls 40, when not engaging the driver gear 38, allow the hub assembly 10 to "free wheel" or rotate freely on the fixed hub axle 14 when coasting. When propelling the bicycle forward, or in a driving mode, the pawls 40 engage the driver gear 38 and rotate the hub assembly 10 on the hub axle 14. The pawls 40 are shown in FIGS. 3 and 4.

It is important to note that in this drawing, a large portion of the hub axle 14 is shown extending outwardly from the second hub axle bearing 28 toward the second end 22 of the hub axle 14. This feature creates the unsupported hub axle span 16. By leaving this portion of the hub axle free to flex, it causes inherent bearing misalignment, premature bearing failure and a lack of wheel rigidity. In FIG. 2, the rear hub axle 14 is shown with a left hub axle dropout stud 20 for engaging one of the dropouts 24 and a threaded hub axle end cap 42 with a right hub axle dropout stud 22 for engaging the other dropout 24.

In FIG. 3, an exploded, perspective view of the subject substantially improved hub assembly is shown having general reference numeral 44. The hub assembly 44 includes a hollow cassette body 46 that is attached to and supported by a hub shell extension 50. The hub shell extension is independent of the rear hub axle 14, with the objects and advantages of this key feature mentioned above.

An outer circumference of the cassette body 46 includes a plurality of spaced apart splines 47, disposed along a length of the body. The splines 47 are used for engaging the chain gear sprockets 18, shown in FIG. 1, and holding the sprockets thereon. The cassette body 46 also includes a dust cover 49 and O-ring seal 62 that are recessed into a dust cover cavity 37, shown in FIG. 4.

The hub assembly 44 also includes a hollow hub shell 48 having a different configuration when compared to the hub shell 12, as shown in FIGS. 1 and 2. The hub shell 48 includes a first end 51 and a second end 53. The hub shell 48 also includes the hollow, hub shell extension 50 extending outwardly to the second end 53. The hub shell extension 50 is used to support the cassette body 46 and is threaded internally to accept a threaded end 68 of a bearing cup 52, which is received through the cassette body 46. The bearing cup 52 includes a second bearing bore 54, shown in FIG. 4, for receiving the second hub axle bearing 28 therein.

In FIG. 4, a cross sectional view of the hub assembly 44 is illustrated and taken along lines 4-4 as shown in FIG. 3. In this drawing, the rear hub axle 14 is shown extending through the first bearing 26, the hollow hub shell 48, and the hub shell extension 50. The first end 20 of the hub axle 14 is shown disposed next to the first hub axle bearing 26 with a spacer 55 and a seal 57 there between. The driver gear 38 and pawls 40 are shown positioned for inserting into the driver gear cavity 36. The hub shell extension 50 includes a bushing 56 which mates to a bushing 58 in the left end of the cassette body 46. A spacer 60 positions the cassette body 46 correctly relative to an inside of the driver gear cavity 36. An "O" ring seal 62 is attached to the dust cover 49, which recesses into a dust cover cavity 37. The cassette body 46 includes three pawl pockets 63 for receipt of the pawls 40, which ratchet inside of the driver gear 38.

Also shown in this drawing is a cassette body bearing 66, which is held in place inside of the cassette body 46 by a snap ring 64. The bearing cup 52 extends through the cassette body bearing 66 and attaches the cassette body 46 to the hub shell extension 50 by use of mating threads 67 and 68. The bearing 66 and the pair of bushings 56 and 58, all of which are supported by the hub extension 50, which in turn support the cassette body 46.

Further, the hub axle end cap 42 is shown positioned for attachment to a threaded hub axle end 15 for securing the hub axle 14 inside the bearings 26 and 28. A seal 70 is positioned between the end cap 42 and the bearing 28. Another seal 57 is positioned between the spacer 55 and the bearing 26.

Figure 5:
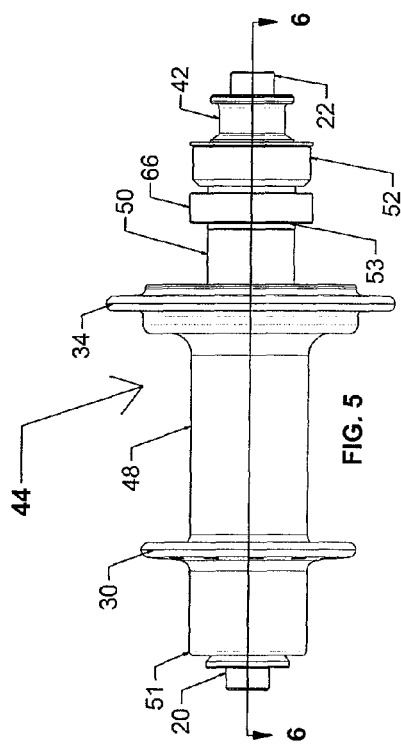
FIG. 5 is a front view of an assembled hub assembly shown in FIG. 3, but without the cassette body mounted thereon.

In FIG. 5, a front view of the assembled hub assembly 44 is illustrated, but without the cassette body 46 mounted thereon. In this drawing, the cassette body bearing 66 is shown received around the end 53 of the hub shell extension 50 and next to the bearing cup housing 52.

Figure 6:
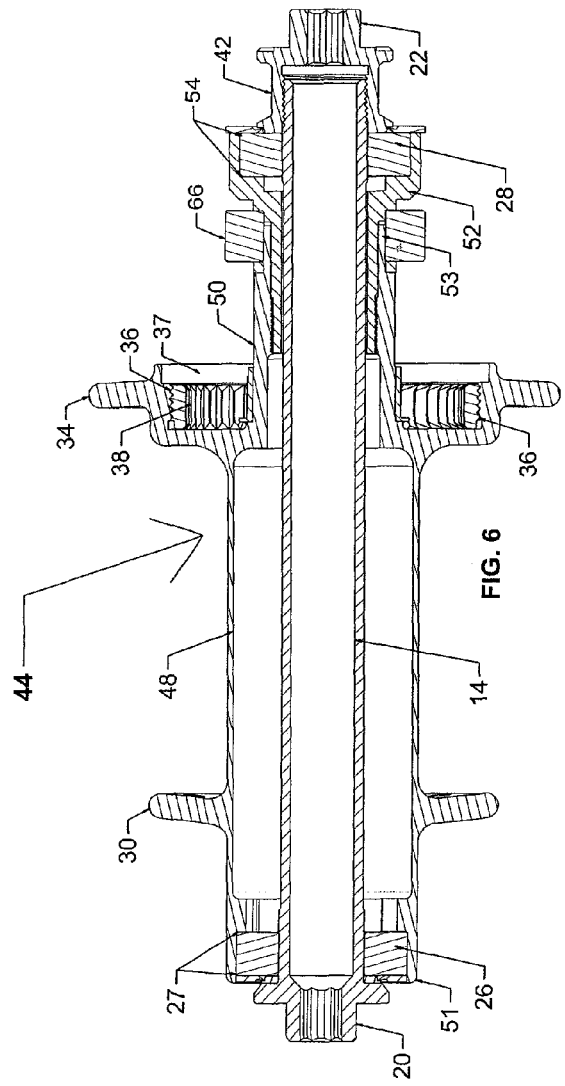
FIG. 6 is a cross sectional view of the hub assembly shown in FIG. 5 and taken along lines 6-6.

In FIG. 6, a cross sectional view of the hub assembly 44 is illustrated and taken along lines 6-6, shown in FIG. 5. In this sectional view, the driver gear 38 is shown received inside the driver gear cavity 36 in the driver side flange 34. Also, this drawing illustrates the hollow hub shell 48, with threaded bearing cup 52 attached to the hub shell extension 50, supported on the first hub axle bearing 26 and the second hub axle bearing 28. The two bearings 26 and 28 are shown attached to the first end 51 of the hub shell 48 and the bearing bore 54 of the threaded bearing cup 52, thus eliminating the unsupported span 16 of the hub axle 14, as shown in FIGS. 1 and 2.

In FIG. 7, a front perspective view of a completely assembled hub assembly 44 is shown including the cassette body 46, as shown in FIG. 3, mounted thereon. The hub assembly 44 is now ready for attaching a bicycle rear wheel to the dropouts 24 of the bicycle frame and receiving the chain gear sprockets 18 around the cassette body 46.

In FIG. 8, a rear perspective view of the completely assembled hub assembly 44 with the cassette body 46 is shown.

In FIG. 9, a cross sectional view of the assembled hub assembly 44 is illustrated and taken along lines 9-9 shown in FIG. 7. In this drawing, as mentioned above, it is important to note that the unsupported span 16 is now eliminated by having the second hub axle bearing 28 moved outwardly from the hub shell 48 and next to the threaded end 15 of the hub axle 14. With this added support of the rear hub axle 14, hub axle flexing is reduced during gear loading. Also, misalignment of the bearings is reduced for improved bearing life. Further, lateral rigidity of the entire rear wheel is increased.

Also shown in this drawing is the cassette body 46 centered on and supported by the cassette body bearing 66. The cassette body bearing 66 is disposed next to the second hub axle bearing 28. With the cassette body 46 attached to the hub shell 48, both the cassette body and the hub shell can free wheel when coasting and then rotate when the driver gear 38 is engaged by the pawls 40 when the bicycle is in a driving mode.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right are claimed are defined as follows:

1. A rear wheel hub assembly adapted for mounting on a bicycle rear wheel and a bicycle frame, the hub assembly also adapted for receiving a plurality of chain gear sprockets thereon, the hub assembly comprising:
   a hollow hub shell, the hub shell having a first end and a second end, the hub shell having a first flange disposed around an outer circumference of the hub shell and a spaced apart driver side flange disposed around the outer circumference of the hub shell;
   a hub axle, the hub axle having a first end and a second end, the hub axle received through the hub shell, the first and the second end of the hub axle adapted for attachment to the bicycle frame;
   a first hub axle bearing, the first hub axle bearing mounted on the first end of the hub axle and supporting the hub axle thereon, the first hub axle bearing disposed next to the first flange;
   a driver gear mounted in a driver gear cavity in one side of the driver side flange, the driver gear used for driving and coasting the hub assembly on the hub axle;
   a hollow cassette body, the cassette body having an outer circumference adapted for receiving the gear sprockets thereon, one end of the cassette body attached to the driver side flange;
   a bearing cup received inside the cassette body, the bearing cup attached to the second end of the hub shell;
   a second hub axle bearing, the second hub axle bearing mounted on the second end of the hub axle and supporting the hub axle thereon, the bearing cup having a bearing bore for receiving and supporting the second hub axle bearing therein; and
   an hub axle end cap, the end cap used for securing the hub axle to the first and second axle bearings.

2. The hub assembly as described in claim 1 further including a cassette body bearing, the cassette body bearing mounted inside the cassette body and supporting the cassette body thereon.

3. The hub assembly as described in claim 1 wherein the first end of the hub shell includes a bearing bore for receiving the first hub axle bearing therein.

4. The hub assembly as described in claim 1 wherein the driver side flange includes a driver gear cavity for receiving the driver gear therein.

5. The hub assembly as described in claim 1 wherein the driver gear includes a set of pawls used for driving and coasting the hub assembly on the rear hub axle.

6. The hub assembly as described in claim 1 wherein the hub shell includes a hollow hub shell extension, the hub shell extension extending outwardly to the second end of the hub shell, the hub shell extension connected to one end of the bearing cup.

7. The hub assembly as described in claim 1 wherein the one end of the bearing cup is threaded for attachment to the hub shell extension.

8. A rear wheel hub assembly adapted for mounting on a bicycle rear wheel and a bicycle frame, the hub assembly also adapted for receiving a plurality of chain gear sprockets thereon, the hub assemble comprising:
   a hollow hub shell, the hub shell having a first end and a second end, the hub shell having a circular first flange disposed around an outer circumference of the hub shell and a spaced apart circular driver side flange disposed around the outer circumference of the hub shell;
   a rear hub axle, the rear hub axle having a first end and a second end, the hub axle received through the hub shell, the first and the second end of the hub axle adapted for attachment to the bicycle frame;
   a first hub axle bearing, the first hub axle bearing mounted on the first end of the hub axle and supporting the hub axle thereon, the first hub axle bearing disposed next to the first flange;
   a driver gear with a set of pawls mounted therein, the driver gear and pawls used for driving and coasting the hub assembly on the rear hub axle;
   a hollow cassette body, the cassette body having an outer circumference adapted for receipt of the gear sprockets thereon, one end of the cassette body attached to the second end of the hub shell;
   a cassette body bearing, the cassette body bearing mounted inside the cassette body and supporting the cassette body thereon;
   a threaded bearing cup received inside the cassette body, the bearing cup attached to the second end of the hub shell;
   a second hub axle bearing, the second hub axle bearing mounted on the second end of the hub axle and supporting the hub axle thereon, the bearing cup having a bearing bore for receiving and supporting the second hub axle bearing therein; and
   a hub axle end cap, the end cap used for securing the hub axle on the first and second bearings.

9. The hub assembly as described in claim 8 wherein the first end of the hub shell includes a bearing bore for receiving the first hub axle bearing therein.

10. The hub assembly as described in claim 8 wherein the driver side flange includes a driver gear cavity for receiving the driver gear therein.

11. The hub assembly as described in claim 8 wherein the hub shell includes a hollow hub shell extension, the hub shell extension extending outwardly to the second end of the hub shell, the hub shell extension connected to one end of the bearing cup.

12. The hub assembly as described in claim 11 wherein the one end of the bearing cup is threaded for attachment to the hub shell extension.

13. A rear wheel hub assembly adapted for mounting on a bicycle rear wheel and a bicycle frame, the hub assembly also adapted for receiving a plurality of chain gear sprockets thereon, the hub assembly comprising:
   a hollow hub shell, the hub shell having a first end and a second end, the hub shell having a first flange disposed around an outer circumference of the hub shell and a spaced apart driver side flange disposed around the outer circumference of the hub shell;
   a hub axle, the hub axle having a first end and a second end, the hub axle received through the hub shell, the first and the second end of the hub axle adapted for attachment to the bicycle frame;

a first hub axle bearing, the first hub axle bearing mounted on the first end of the hub axle and supporting the hub axle thereon, the first hub axle bearing disposed next to the first flange;

a driver gear mounted in a driver gear cavity in one side of the driver side flange, the driver gear used for driving and coasting the hub assembly on the hub axle;

a hollow cassette body, the cassette body having an outer circumference adapted for receiving the gear sprockets thereon, one end of the cassette body positioned under the driver side flange;

a bearing cup received inside the cassette body, the bearing cup attached to the second end of the hub shell;

a hollow hub shell extension, the hub shell extension extending outwardly to the second end of the hub shell, the hub shell extension connected to one end of the bearing cup;

a second hub axle bearing, the second hub axle bearing mounted on the second end of the hub axle and supporting the hub axle thereon, the bearing cup having a bearing bore for receiving and supporting the second hub axle bearing therein; and a hub axle end cap, the end cap used for securing the hub axle to the first and second axle bearings.

14. The hub assembly as described in claim 13 further including a cassette body bearing, the cassette body bearing mounted inside the cassette body and supporting the cassette body thereon.

15. The hub assembly as described in claim 13 wherein the first end of the hub shell includes a bearing bore for receiving the first hub axle bearing therein.

16. The hub assembly as described in claim 13 wherein the driver side flange includes a driver gear cavity for receiving the driver gear therein.

17. The hub assembly as described in claim 13 wherein the driver gear includes a set of pawls used for driving and coasting the hub assembly on the rear hub axle.

18. The hub assembly as described in claim 13 wherein the one end of the bearing cup is threaded for attachment to the hub shell extension.

* * * * *